(12) United States Patent
Nakamura et al.

(10) Patent No.: US 7,146,107 B2
(45) Date of Patent: Dec. 5, 2006

(54) METHOD AND APPARATUS FOR ADJUSTING FILTER DEVICE

(75) Inventors: Kentaro Nakamura, Kawasaki (JP); Hiroki Ooi, Kawasaki (JP); Tomoo Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 587 days.

(21) Appl. No.: 10/737,881

(22) Filed: Dec. 18, 2003

(65) Prior Publication Data

US 2004/0141756 A1   Jul. 22, 2004

(30) Foreign Application Priority Data

Jan. 16, 2003   (JP)   ............................. 2003-008424

(51) Int. Cl.
*H04B 10/12* (2006.01)

(52) U.S. Cl. ...................... 398/147; 398/148; 398/149; 398/158; 398/159; 398/81; 398/84; 398/85; 398/87; 398/25; 398/26; 398/27; 398/33; 398/38; 398/192; 398/195; 398/196; 398/208; 398/209; 398/213; 398/214; 398/162; 398/93; 398/94; 398/95; 385/24; 385/37

(58) Field of Classification Search ................ 398/147, 398/149, 214, 148, 158, 159, 162, 81, 84, 398/85, 87, 93, 94, 95, 25, 26, 27, 33, 38, 398/192, 195, 196, 208, 209, 213; 385/24; 385/37

See application file for complete search history.

(56) References Cited

U.S. PATENT DOCUMENTS 6,871,024 B1 * 3/2005 Nishimoto et al. ......... 398/159

6,925,262 B1 * 8/2005 Ooi et al. .................. 398/147
2001/0028759 A1   10/2001   Cao
2002/0006257 A1   1/2002   Danziger et al.

FOREIGN PATENT DOCUMENTS

| EP | 1 265 086 | 12/2002 |
| EP | 1 273 937 | 1/2003 |
| JP | 5-268108 | 10/1993 |

OTHER PUBLICATIONS

European Search Report dated Mar. 23, 2006 of Application No. EP 03 02 9212.

* cited by examiner

*Primary Examiner*—Hanh Phan
(74) *Attorney, Agent, or Firm*—Staas & Halsey LLP

(57) ABSTRACT

A tunable dispersion compensator whose passband center wavelength changes when the amount of dispersion compensation is changed is suitably adjusted. The relationship between temperature for keeping the center wavelength constant and the amount of dispersion compensation is stored in advance. After controlling the amount of dispersion compensation to achieve best or optimum transmission quality, the amount of dispersion compensation is converted into temperature in accordance with the stored relationship and, based on that, the temperature is controlled to keep the center wavelength constant.

22 Claims, 22 Drawing Sheets

METHOD AND APPARATUS FOR ADJUSTING FILTER DEVICE

BACKGROUND OF THE INVENTION

1. Field of the Invention

The present invention relates to the adjustment of a filter device and, in particular, to the adjustment of a tunable chromatic dispersion compensating device, used in an optical transmission system.

2. Description of the Related Art

In recent years, work has been proceeding to increase the capacity of optical wavelength division multiplexing (WDM) transmission systems. There are two main ways of increasing the capacity: one is to increase the number of wavelengths, and the other is to increase the bit rate. As for the bit rate, 10-Gb/s optical transmission systems have already been commercially implemented, and the development of 40-Gb/s optical transmission systems is currently under way.

As the bit rate increases, the influence of the degradation of optical signal waveforms due to chromatic dispersion of optical fibers increase, and degradation in transmission quality becomes more pronounced. That is, the dispersion tolerance decreases, decreasing the allowable range of the amount of dispersion. This necessitates the provision of an automatic dispersion compensation system that can cope with the variation of chromatic dispersion with temperature, aging, and the like, in addition to the dispersion-compensating fibers used for dispersion compensation in traditional systems.

An example of a tunable chromatic dispersion compensating device used in such an automatic dispersion compensation system is the VIPA (Virtually Imaged Phased Array) described in a document presented by M. Shirasaki et al., "Dispersion Compensation Using the Virtually Imaged Phased Array," APCC/OECC '99, pp. 1367–1370, 1999.

In the automatic dispersion compensation method using the VIPA, when the amount of dispersion compensation is changed by moving a mirror, the center wavelength of the passband also changes at the same time. As a result, the optical signal spectrum changes, affecting the transmission quality.

Further, as the optical transmission system includes other filter devices, such as optical MUX/DEMUX (multiplexing/demultiplexing) filters, the total passband is determined by the combination of these filter devices and the VIPA. When the total passband determined by this combination is considered, there are cases where optimum transmission quality cannot be obtained even when the passband center of the VIPA is aligned with the signal wavelength center.

When a filter device having the above-described passband characteristic is used in the optical transmission system, if the amount of dispersion compensation alone is simply tuned so as to provide the best result, the transmission quality may degrade in certain cases.

Furthermore, if the center wavelength of this filter device is correctly controlled, it does not necessarily follow that the passband center wavelengths of other filter devices placed in the transmission path, such as the optical MUX/DEMUX filters, are also set correctly. The same can be said of the wavelength of the light source. If any of these center wavelengths deviates from the correct value, transmission quality degradation will result. Further, among these devices, there may be a device or devices whose center wavelengths cannot be controlled; therefore, when the total characteristic of the transmission path is considered, adjusting to the specified wavelength may not always lead to the best result.

SUMMARY OF THE INVENTION

It is accordingly an object of the present invention to provide a filter device adjusting method for an optical transmission system that uses a filter device having the above-described characteristics.

As described above, in the case of a filter device such as the VIPA, when the amount of dispersion compensation is changed in order to optimize the amount of dispersion compensation in a transmission path, the passband center also changes. The passband of the VIPA also changes when the temperature of the device changes, but in this case, the amount of dispersion compensation remains essentially unchanged. That is, a filter device such as the VIPA has two tunable parameters, the amount of dispersion compensation and the temperature, that can be controlled substantially independently of each other, and a passband that varies in a manner dependent on both of the two tunable parameters.

According to the present invention, there is provided a filter device adjusting method for an optical transmission system that uses a filter device having first and second tunable parameters that can be controlled substantially independently of each other and a passband characteristic that varies in a manner dependent on both of the first and second tunable parameters, the method comprising the steps of: (a) controlling the first tunable parameter so that received optical signal quality in the optical transmission system becomes best or optimum; (b) determining, from the amount of change of the first tunable parameter in step (a), the amount of change of the second tunable parameter that can compensate for a resulting change occurring in the passband characteristic; and (c) changing the second tunable parameter of the filter device in accordance with the determined amount of change of the second tunable parameter.

The first tunable parameter is, for example, the amount of dispersion compensation of the filter device, and the second tunable parameter is, for example, the temperature of the filter device.

Preferably, the method further comprises the step of (d) carrying out, after step (c), step (a) and the step of controlling the temperature of the filter device repeatedly until received optical signal quality in the optical transmission system becomes best or optimum.

DESCRIPTION OF THE PREFERRED EMBODIMENTS

Figure 1:
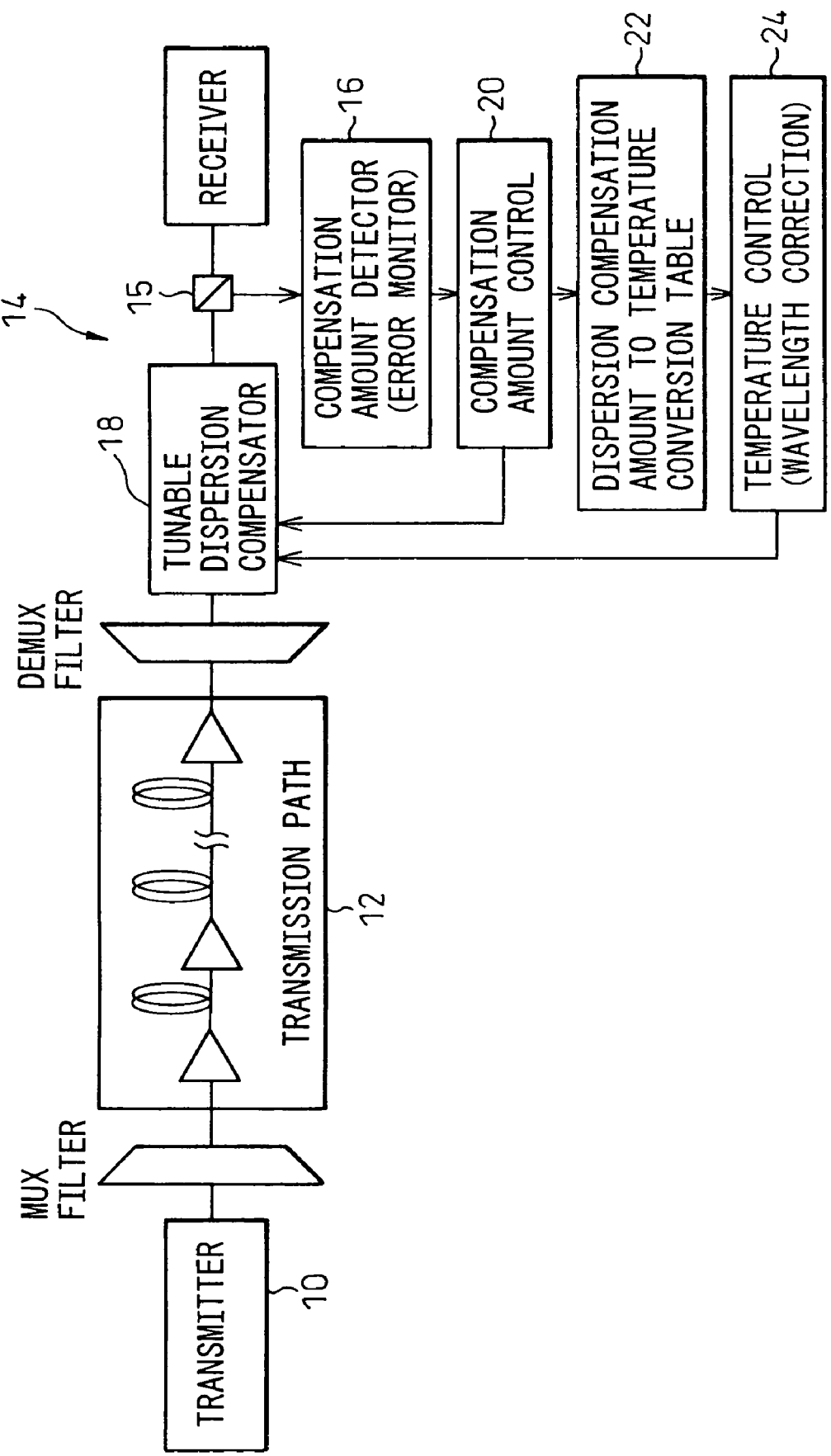
FIG. 1 is a block diagram of an optical transmission system according to a first embodiment of the present invention.
Figure 2:
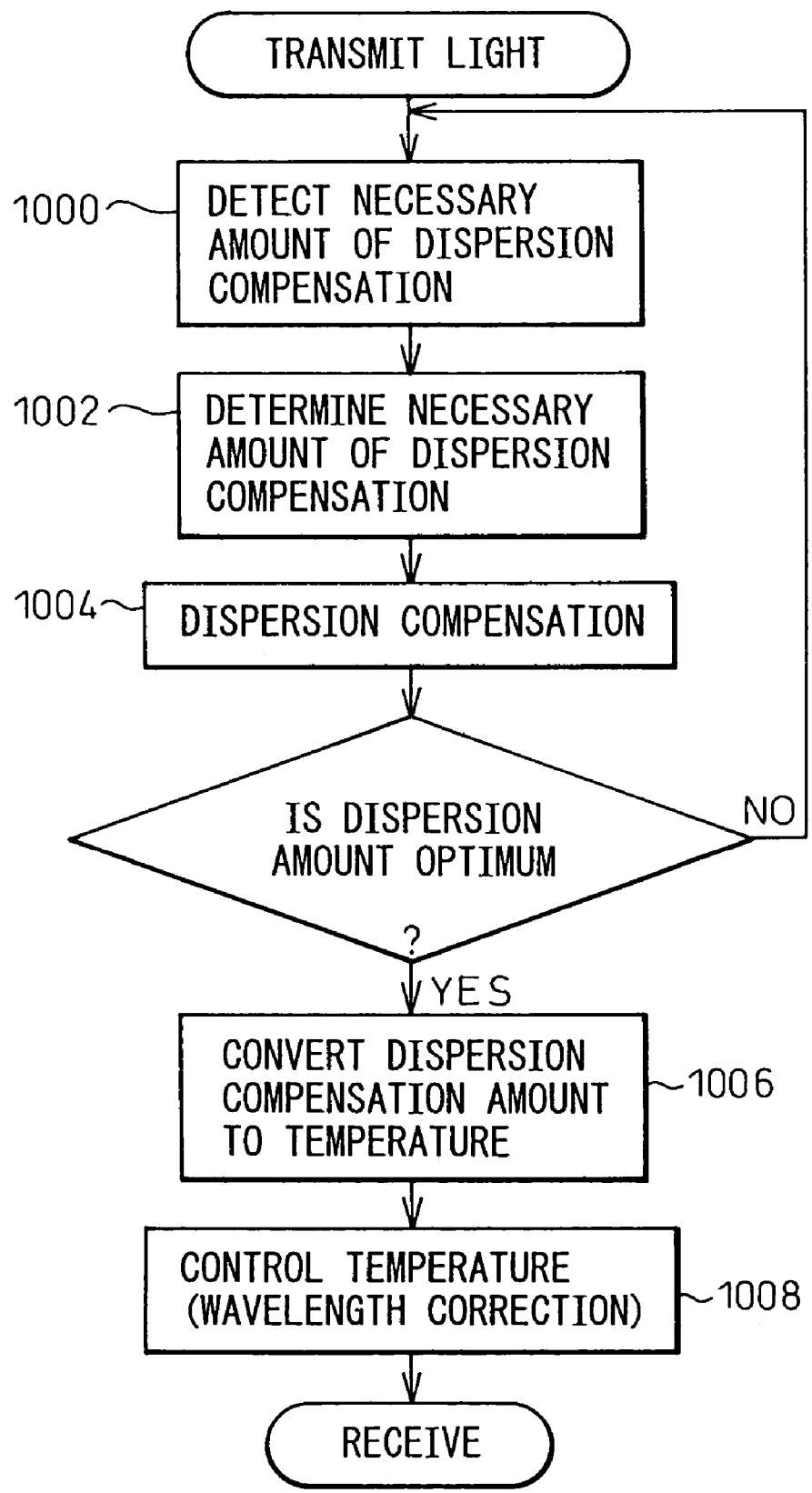
FIG. 2 is a flowchart illustrating the operation of a dispersion compensating section 14 in FIG. 1.

FIG. 1 shows the configuration of one example of an optical transmission system to which a first embodiment of the present invention is applied, and FIG. 2 shows its corresponding flowchart. In this and other embodiments described hereinafter, the filter device that has two tunable parameters which can be set independently of each other, and a passband characteristic which depends on both the parameters, is the tunable dispersion compensator (VIPA), and the two tunable parameters are the amount of dispersion compensation and the temperature of the VIPA. In this tunable dispersion compensator, the passband characteristic changes when any one of the parameters, the amount of dispersion compensation or the temperature, is changed, but there is no substantial interdependence between the amount of dispersion compensation and the temperature.

Figure 3:
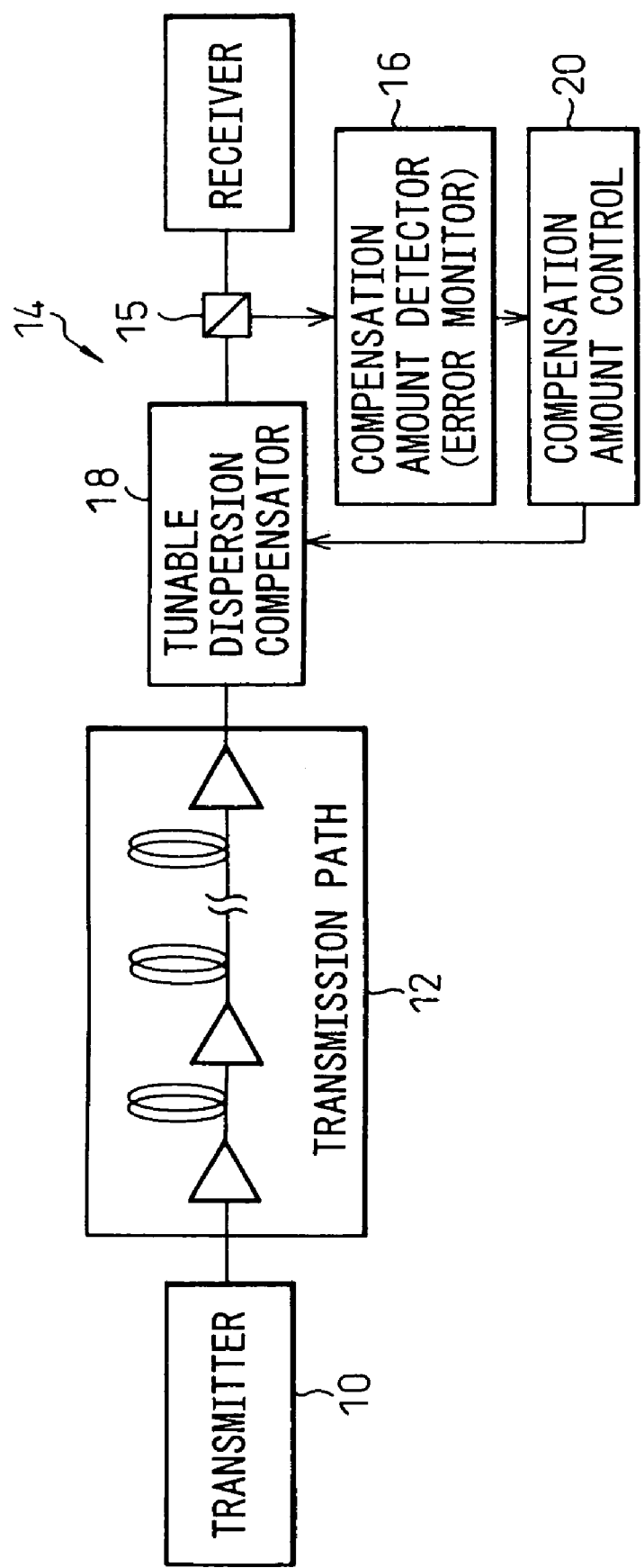
FIG. 3 is a block diagram of an optical transmission system according to the prior art.
Figure 4:
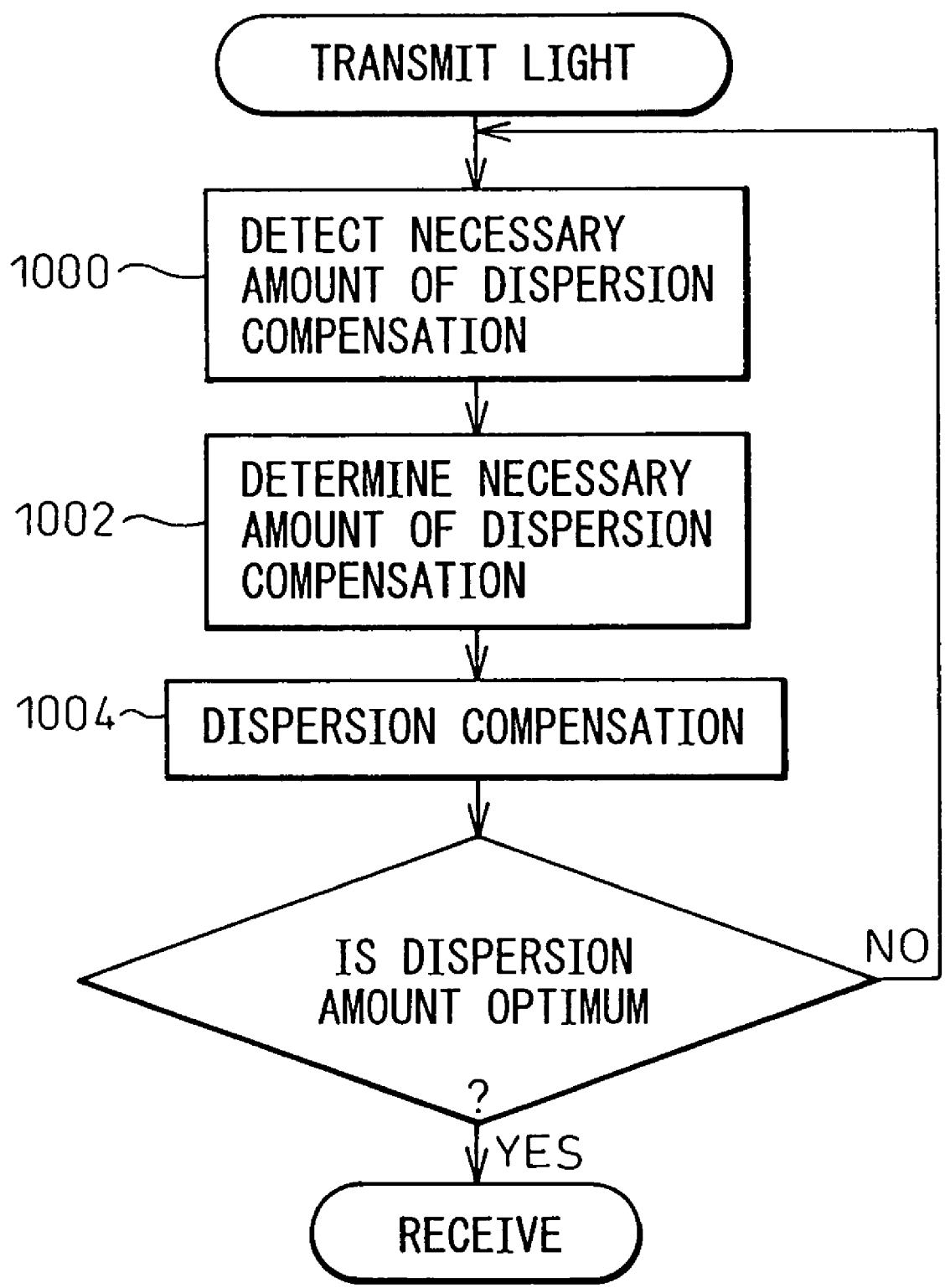
FIG. 4 is a flowchart illustrating the operation of a dispersion compensating section 14 in FIG. 3.

In FIG. 1, an optical signal emitted from a transmitter 10 is transmitted through a transmission path 10 and enters a dispersion compensating section 14. In the prior art, as shown in FIGS. 3 and 4, a portion of the received light, separated by a coupler 15, is fed into a compensation amount determining section (error monitor or the like) 15, which determines the amount of compensation (steps 1000 and 1002) and feeds it back to the tunable dispersion compensator 18, thus performing control to adjust the amount of dispersion compensation (20, step 1004).

In addition, in the present invention, the amount of dispersion compensation thus determined is converted into the amount of change of center wavelength and, by using a predefined conversion table for converting it into temperature information used to compensate for the change (shift the wavelength back to its initial value), the amount of dispersion compensation is further converted into the amount of change of temperature (22, step 1006), which is then fed back to the tunable dispersion compensator 18 (24, step 1008). The temperature of the tunable dispersion compensator 18 is controlled within the temperature range of about 70 to 80° C. by using, for example, a heater.

Figure 5:
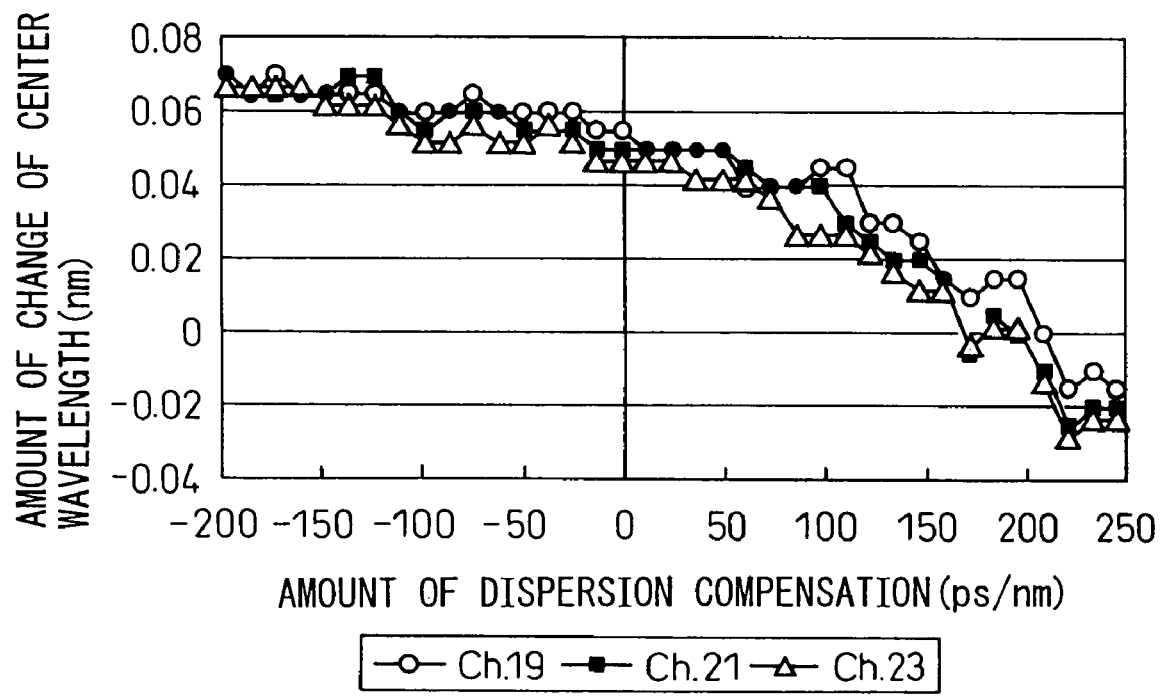
FIG. 5 is a graph showing the relationship between the amount of dispersion compensation and the amount of change of center wavelength in VIPA.
Figure 6:
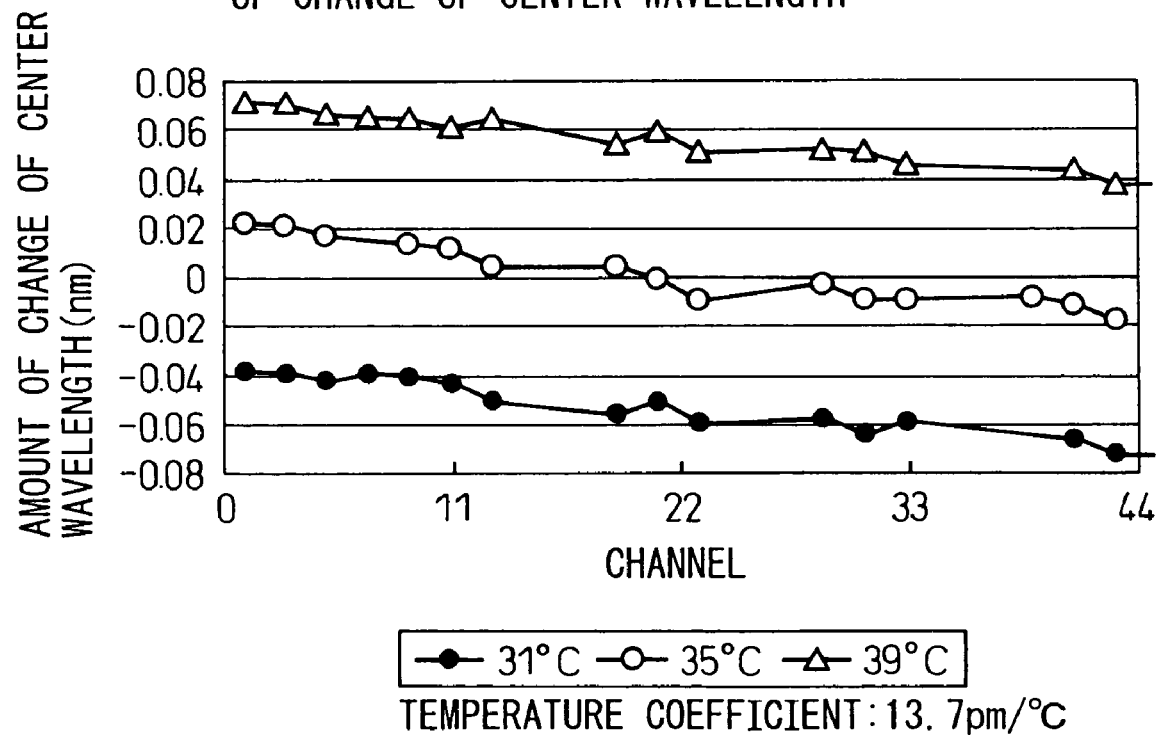
FIG. 6 is a graph showing the relationship between temperature and the amount of change of center wavelength in VIPA.
Figure 7:
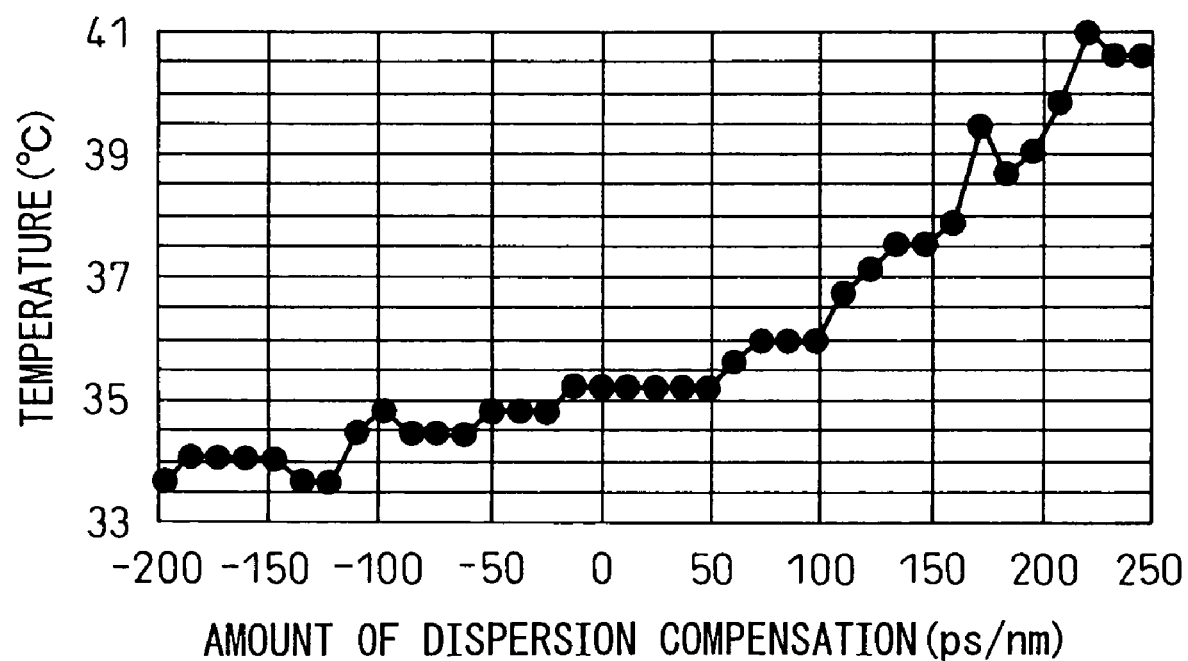
FIG. 7 is a graph showing the relationship between the amount of dispersion compensation and the temperature for keeping the center wavelength constant.

A specific example of the conversion table will be described with reference to FIGS. 5 to 7. FIG. 5 shows the amount of dispersion compensation of a given tunable dispersion compensator and the amount of change of its center wavelength. As shown, in this tunable dispersion compensator, there is a substantially one-to-one correspondence between the amount of dispersion compensation and the amount of change of the center wavelength. FIG. 6 shows the relationship between the temperature of this tunable dispersion compensator and the amount of change of the center wavelength. In this tunable dispersion compensator, as shown in FIG. 6, there is a linear relationship between the temperature and the amount of change of the center wavelength.

Since there is no correlation between the temperature and the amount of dispersion compensation (the amount of dispersion compensation does not change if the temperature is changed), the center wavelength can be kept constant by controlling the temperature in such a direction as to shift the center wavelength back to its initial value whenever the center wavelength changes as a result of dispersion compensation. The relationship between the amount of dispersion compensation and the temperature for shifting back the center wavelength is shown in FIG. 7 for this tunable dispersion compensator, and this is used as the conversion table for converting the amount of dispersion compensation to the temperature. In this way, for any given amount of dispersion compensation, the temperature that suppresses the change of the wavelength can be determined uniquely. In the illustrated table, the temperature is set so that the passband center wavelength matches the ITU-T Grid.

Figure 8:
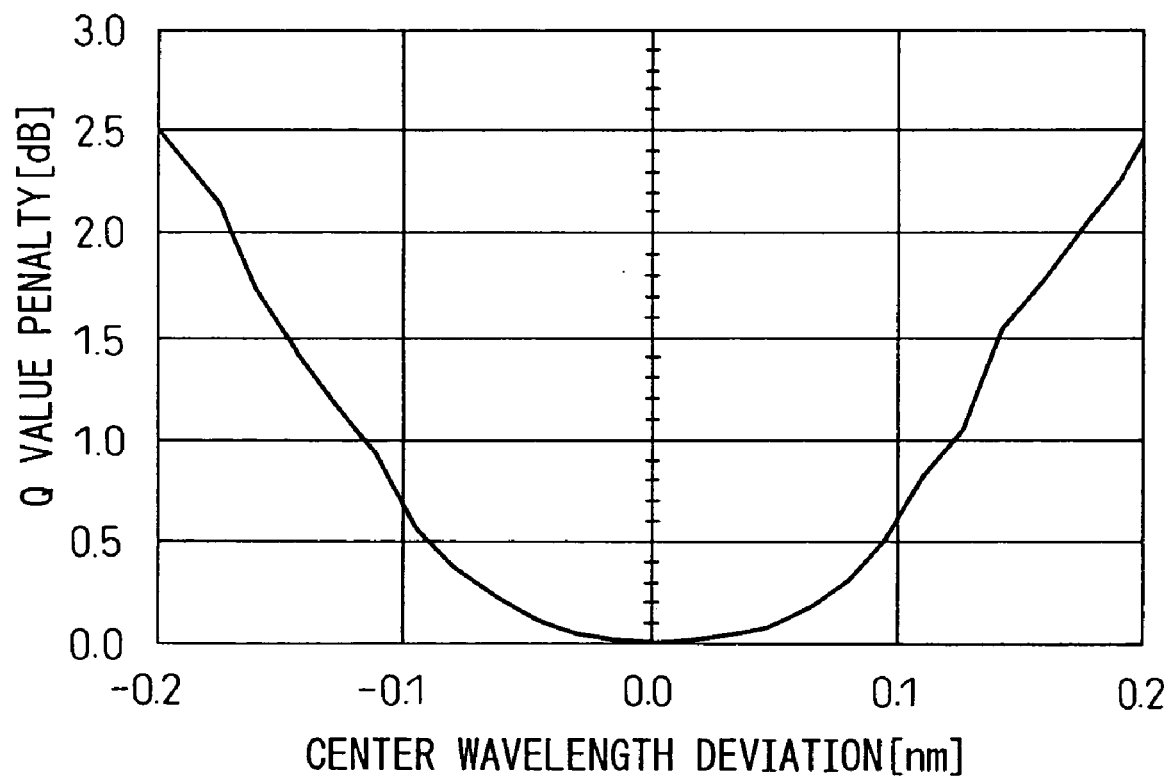
FIG. 8 is a graph showing the relationship between center wavelength deviation and Q value penalty.

FIG. 8 shows calculation results for Q value penalty when the center wavelength has deviated in the prior art that does not perform compensation by temperature control. As shown, if the center wavelength deviates by 1.0 nm, a Q value penalty of about 0.6 to 0.7 dB occurs; on the other hand, when the tunable dispersion compensator is controlled in accordance with the present invention, automatic dispersion control that does not cause a center wavelength deviation becomes possible, and an optical transmission system can be achieved that can perform automatic dispersion compensation while suppressing the influence of passband change.

Figure 9:
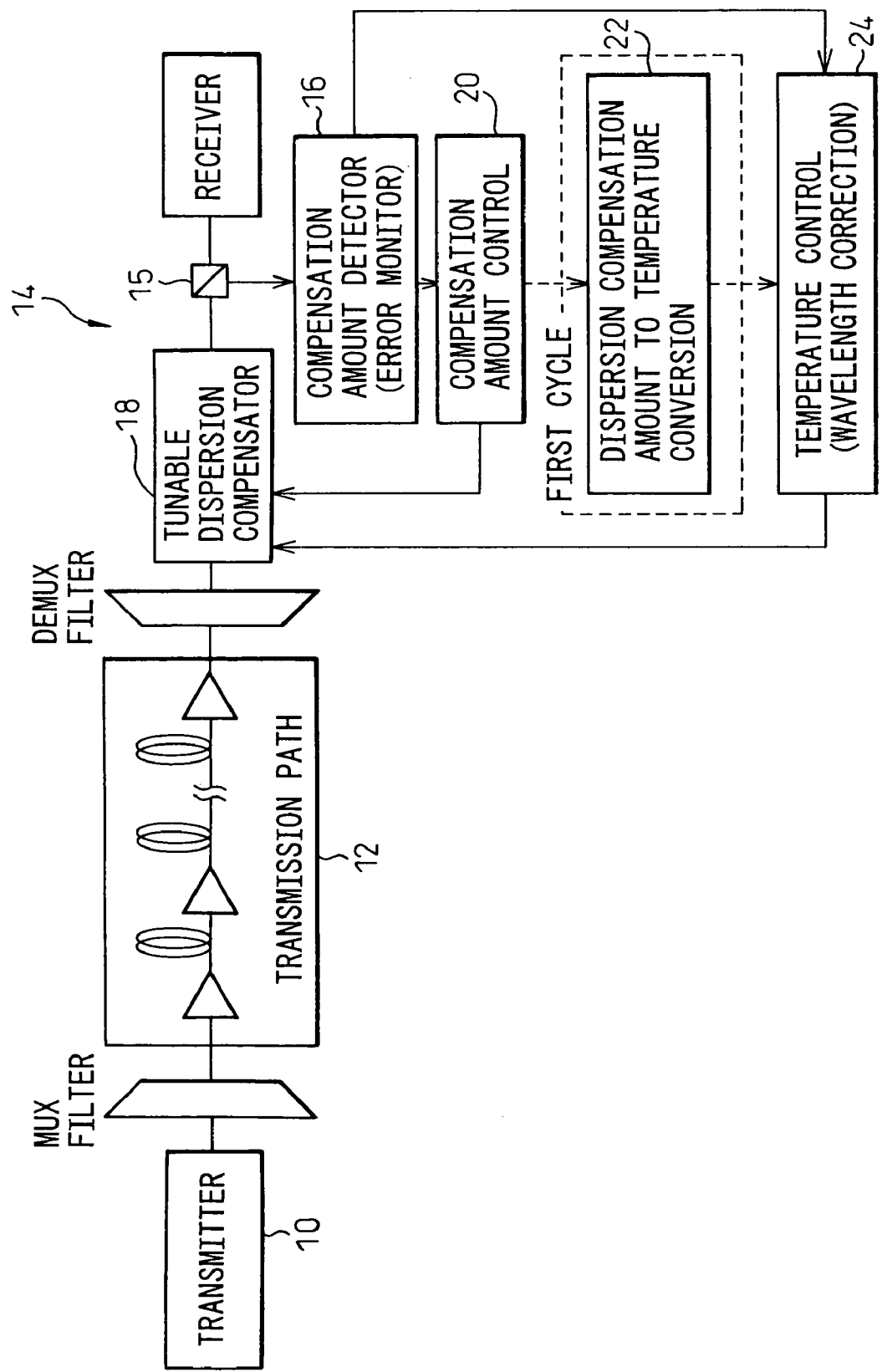
FIG. 9 is a block diagram of an optical transmission system according to a second embodiment of the present invention.
Figure 10:
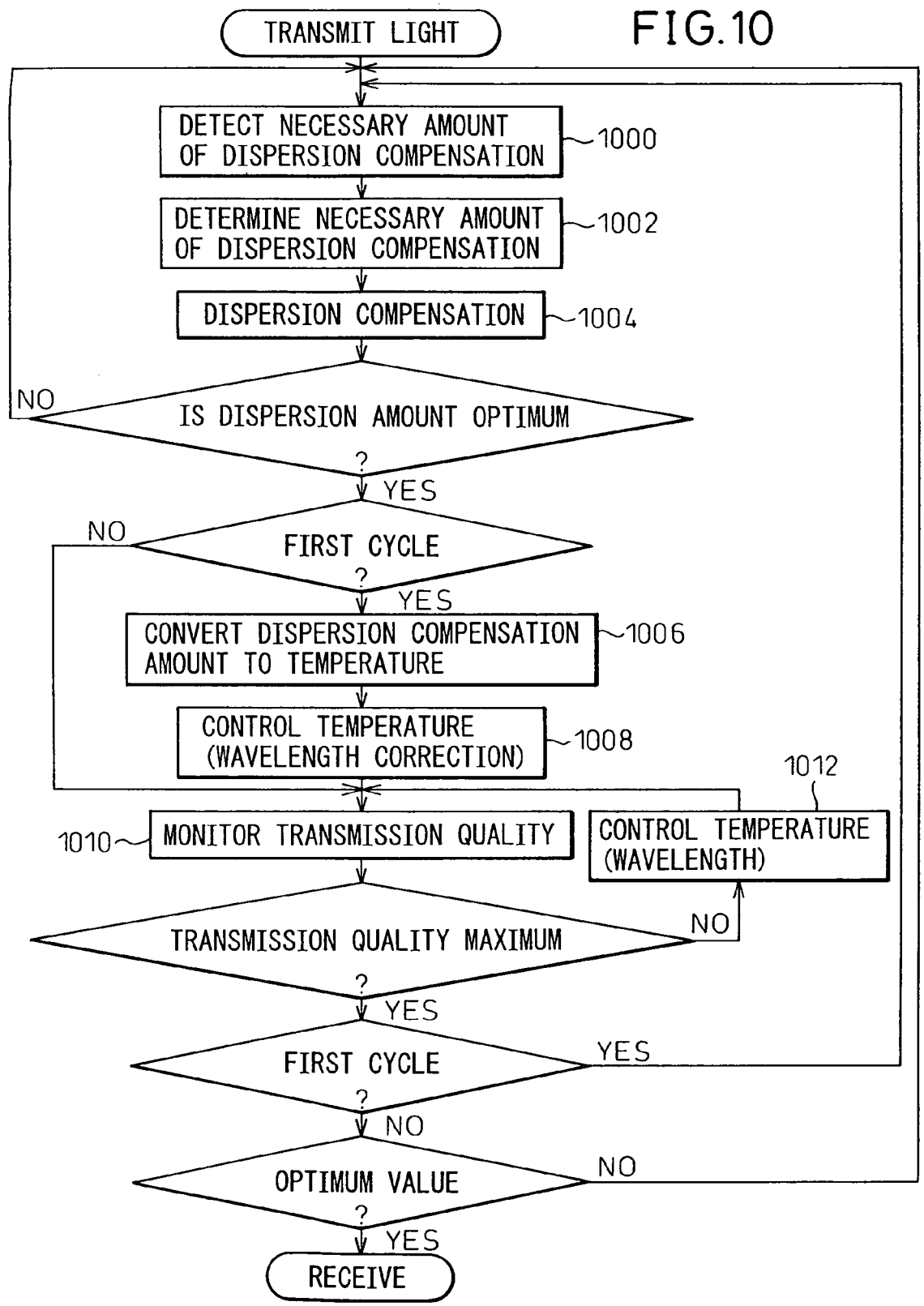
FIG. 10 is a flowchart illustrating the operation of a dispersion compensating section 14 in FIG. 9.

FIG. 9 shows the configuration of an optical transmission system according to a second embodiment of the present invention, and FIG. 10 shows the corresponding flowchart. In addition to controlling the tunable dispersion compensator using the table as in the first embodiment (22 and 24, steps 1006 and 1008), the present embodiment performs the following steps by considering the total characteristics in relation to the wavelengths of other filter devices and the wavelength of the light source; that is, while monitoring the transmission quality (error) (step 1010), the temperature of the tunable dispersion compensator 18, that is, the passband center wavelength of the tunable dispersion compensator, is changed so that the transmission quality becomes best or optimum (24, step 1012), after which the amount of dispersion compensation is controlled (20, steps 1000 to 1004). The steps of controlling the amount of dispersion compensation (steps 1000 to 1004) and the steps of controlling the temperature (steps 1010 and 1012) are repeated until the transmission quality becomes best or optimum. In this way, the center wavelength of the tunable dispersion compensator can be selected more appropriately by considering the relations with the wavelengths of other filter devices and the actual wavelength of the light source, and good transmission quality can thus be achieved.

Figure 11:
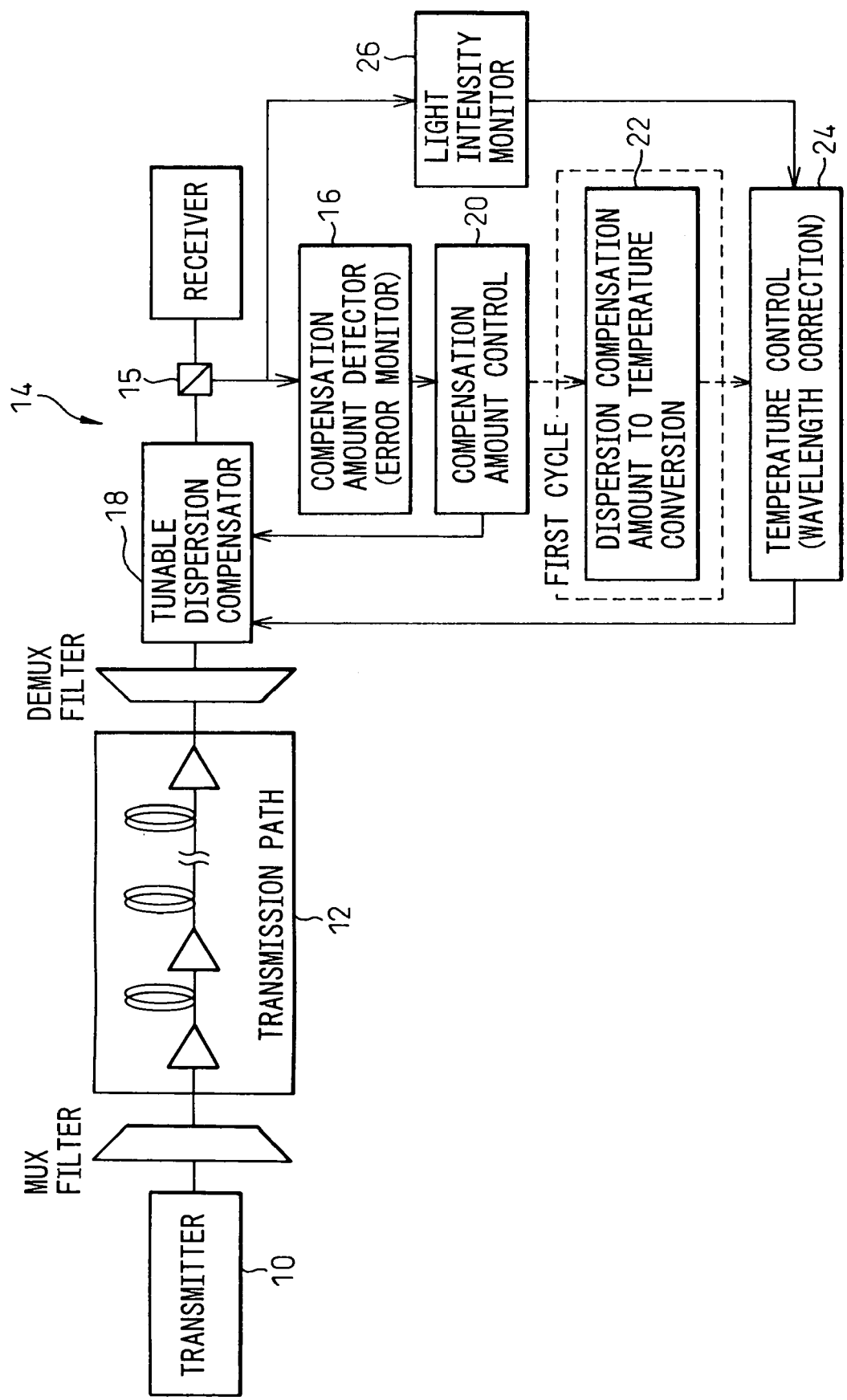
FIG. 11 is a block diagram of an optical transmission system according to a third embodiment of the present invention.
Figure 12:
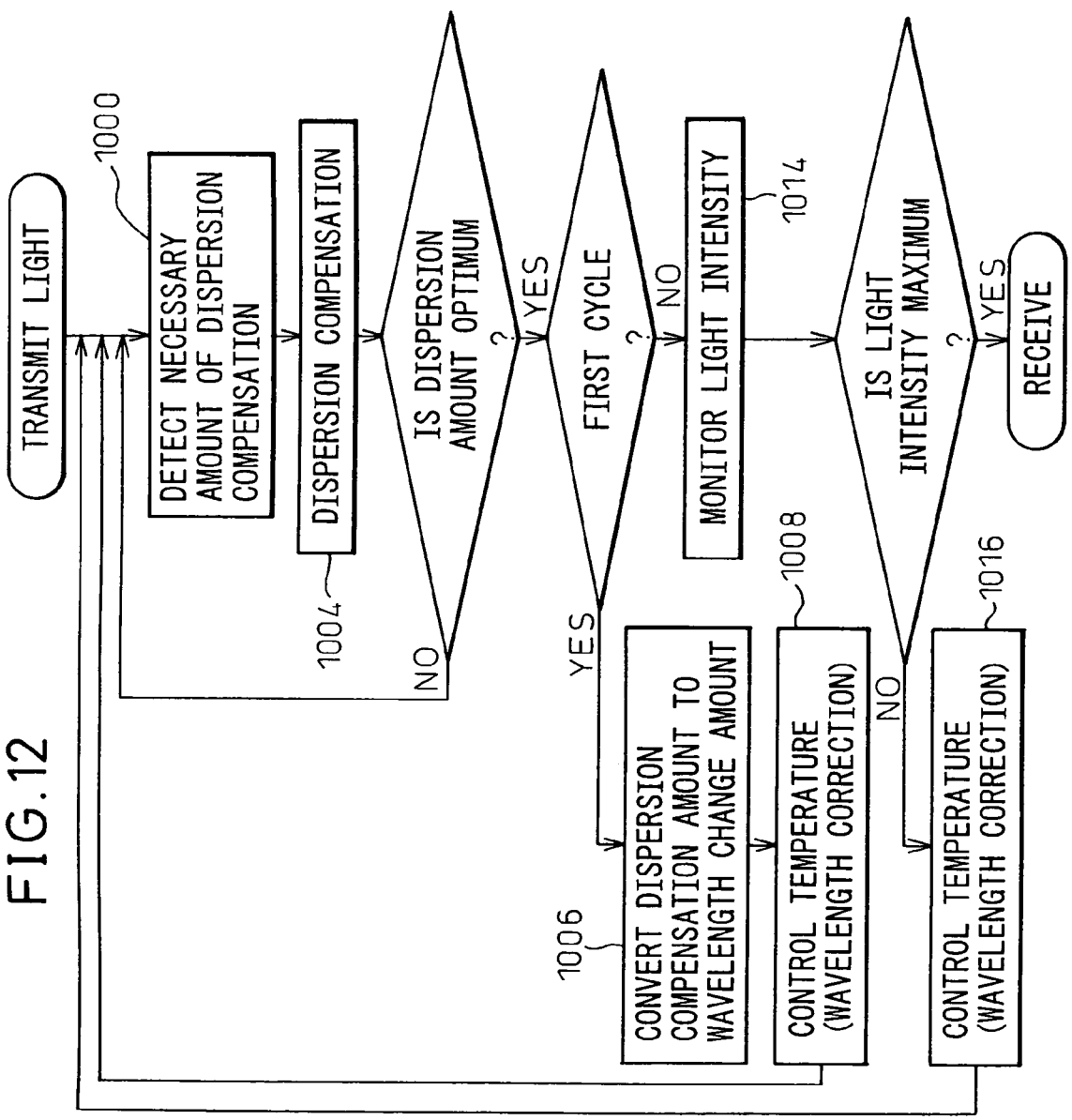
FIG. 12 is a flowchart illustrating the operation of a dispersion compensating section 14 in FIG. 11.

FIG. 11 shows the configuration of an optical transmission system according to a third embodiment of the present invention, and FIG. 12 shows the corresponding flowchart. In addition to controlling the tunable dispersion compensator using the table as in the first embodiment, the present embodiment performs the following steps by considering the total characteristics in relation to the wavelengths of other filter devices and the wavelength of the light source; that is, while monitoring the received light intensity by a light intensity monitor 26 (step 1014), the temperature of the tunable dispersion compensator 18, that is, the passband center wavelength of the tunable dispersion compensator 18, is changed so that the received light intensity becomes best or optimum (24, step 1016). In this way, the center wavelength of the tunable dispersion compensator 18 can be selected more appropriately by considering the relations with the wavelengths of other filter devices and the actual wavelength of the light source, and good transmission quality can thus be achieved.

Figure 13:
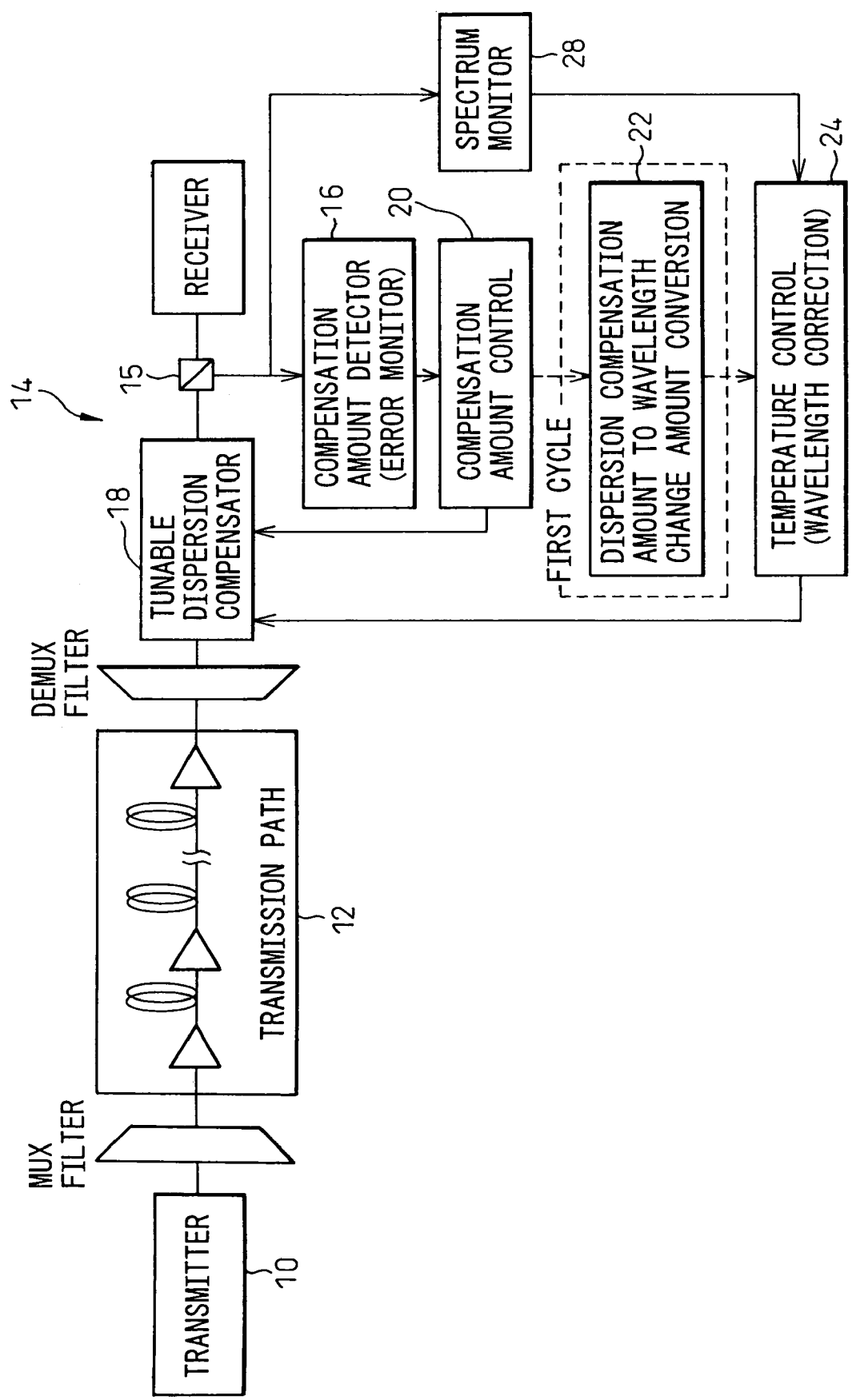
FIG. 13 is a block diagram of an optical transmission system according to a fourth embodiment of the present invention.
Figure 14:
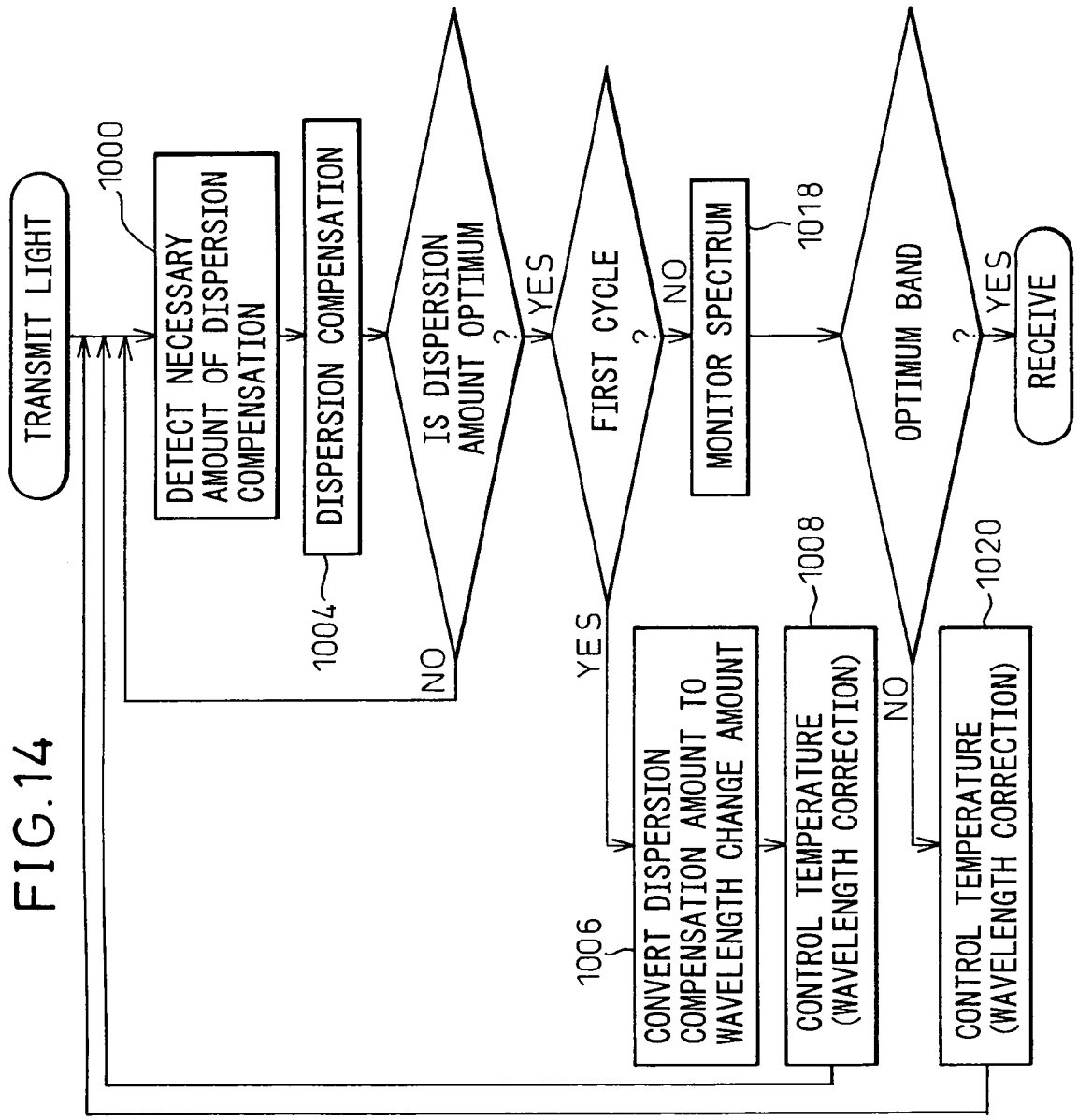
FIG. 14 is a flowchart illustrating the operation of a dispersion compensating section 14 in FIG. 13.
Figure 15:
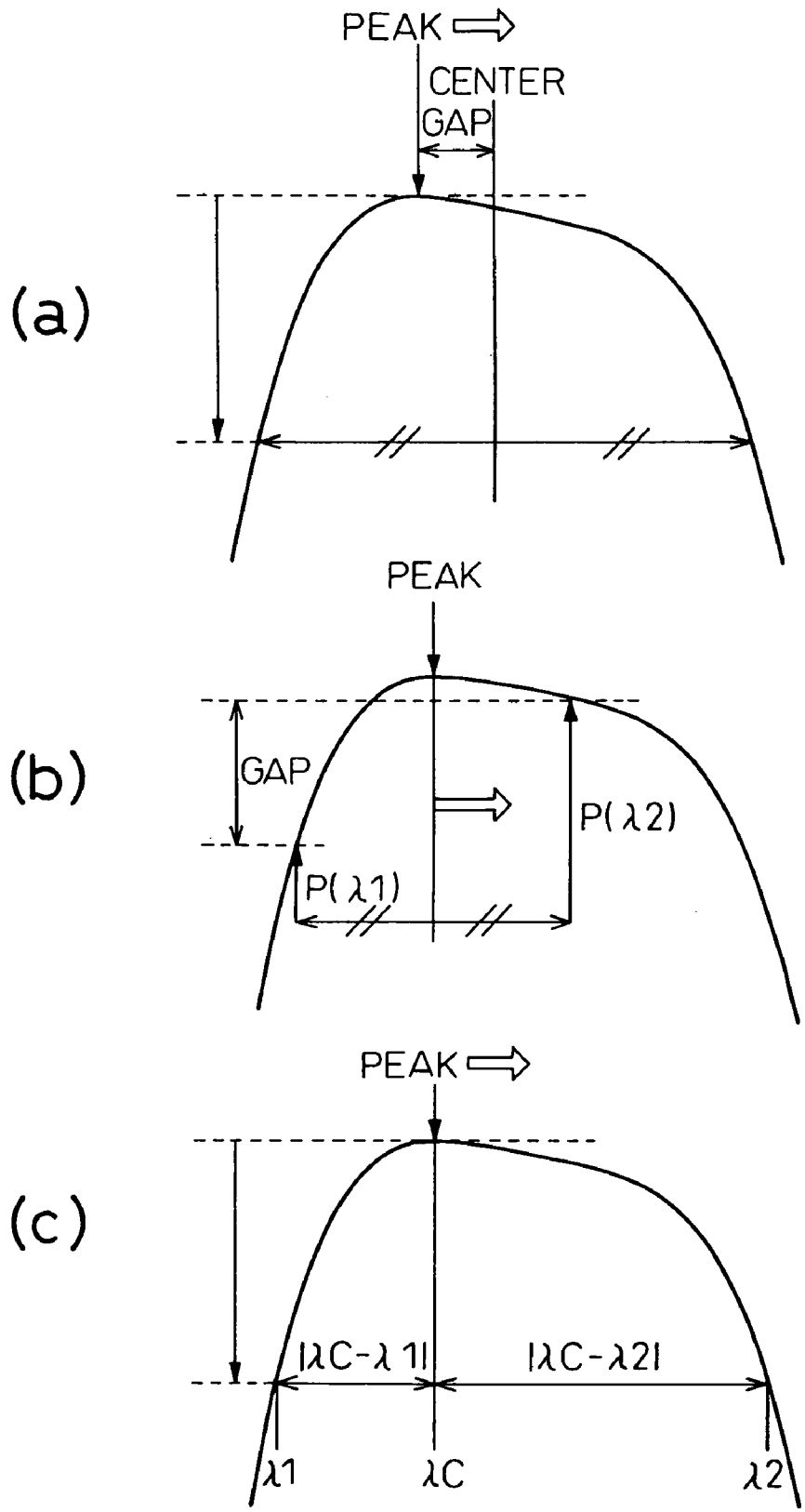
FIG. 15 is a diagram for explaining how the center wavelength is controlled to achieve optimum spectrum.

FIG. 13 shows the configuration of an optical transmission system according to a fourth embodiment of the present invention, and FIG. 14 shows the corresponding flowchart. In addition to controlling the tunable dispersion compensator using the table as in the first embodiment, the present embodiment performs the following steps by considering the total characteristics in relation to the wavelengths of other filter devices and the wavelength of the light source; that is, while monitoring the received spectrum by a spectrum monitor 28 (step 1018), the temperature of the tunable dispersion compensator 18, that is, the passband center wavelength of the tunable dispersion compensator 18, is changed so that the received spectrum becomes optimum (24, step 1020). Three methods shown in parts (a), (b), and (c) of FIG. 15 can be considered for optimizing the spectrum.

(a) A peak value is detected within the signal band of the wavelength, a line lower than the peak point by a prescribed value (for example, 20 dB) is obtained, and the center of the line is taken as the center of the band. Control is performed so that the difference between the center of the band and the peak value becomes zero.

(b) A peak value is detected within the signal band of the wavelength, and the powers $P(\lambda 1)$ and $P(\lambda 2)$ of the wavelengths $\lambda 1$ and $\lambda 2$ located at an equal distance from the peak point are obtained. Control is performed so that $P(\lambda 1)$ and $P(\lambda 2)$ become equal to each other.

(c) A peak value is detected within the signal band of the wavelength, and wavelengths $\lambda 1$ and $\lambda 2$ at points lower than the peak point by a prescribed value (for example, 20 dB) are obtained. Control is performed so that the differences of $\lambda 1$ and $\lambda 2$ relative to the wavelength $\lambda C$ at the peak value point, that is, $|\lambda C - \lambda 1|$ and $|\lambda C - \lambda 2|$, become equal to each other.

In this way, the center wavelength of the tunable dispersion compensator 18 can be selected more appropriately by considering the relations with the wavelengths of other filter devices and the actual wavelength of the light source, and good transmission quality can thus be achieved.

Figure 16:
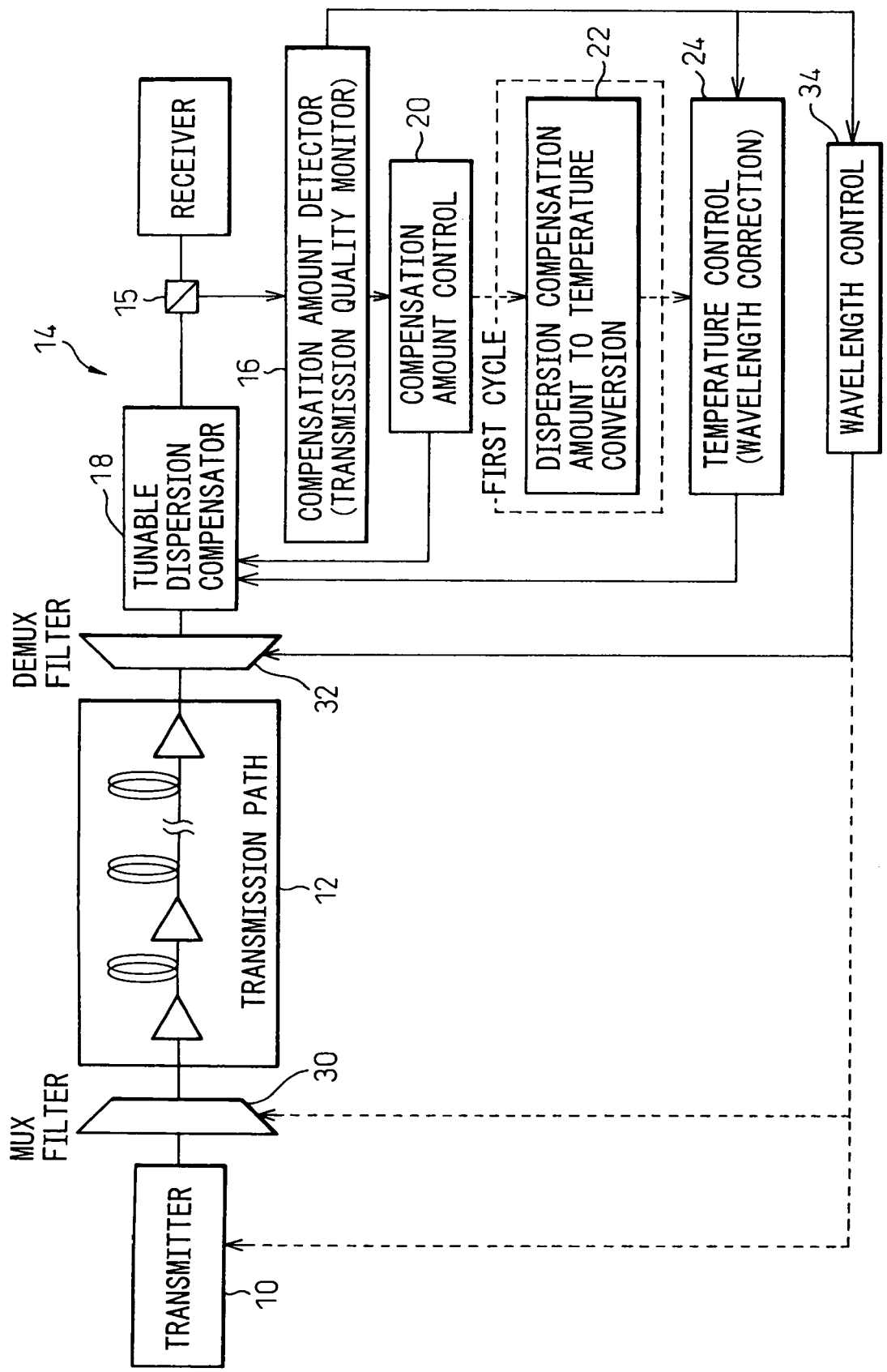
FIG. 16 is a block diagram of an optical transmission system according to a fifth embodiment of the present invention.
Figure 17:
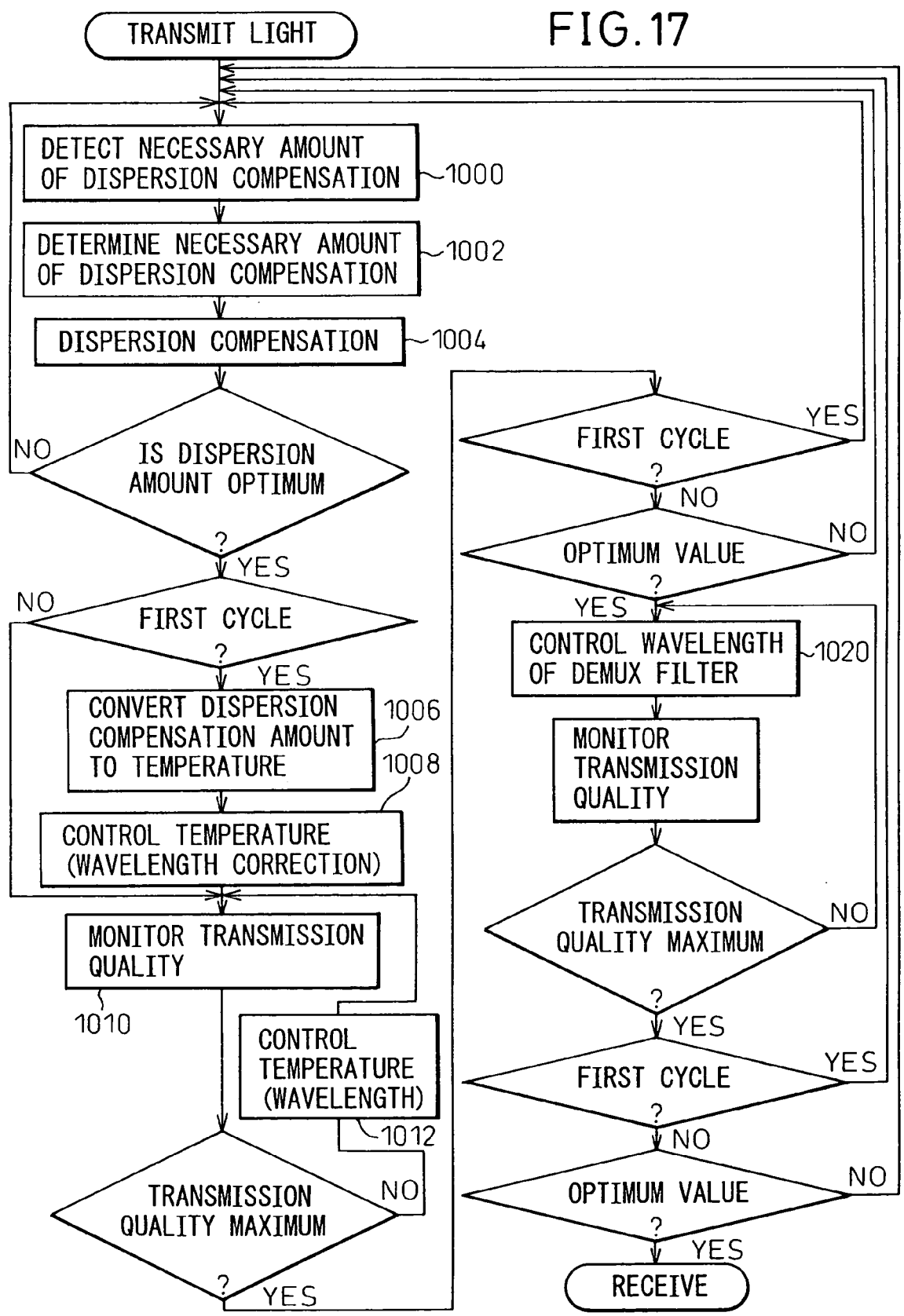
FIG. 17 is a flowchart illustrating the operation of a dispersion compensating section 14 in FIG. 16.

FIG. 16 shows the configuration of an optical transmission system according to a fifth embodiment of the present invention, and FIG. 17 shows the corresponding flowchart. In addition to the control performed in the second embodiment, any one of or all of the wavelengths of the light source 10, the center wavelength of a MUX filter 30, and the center wavelength of a DEMUX filter 32 are changed so that the transmission quality becomes best or optimum (for example, for a least error rate) by using a transmission quality monitor 16 (34, step 1020). FIG. 17 shows an example in which the DEMUX filter 32 is controlled. In this way, the tunable devices such as the light source and the optical MUX/DEMUX filters can be optimized in an overall manner, and better transmission quality can thus be achieved.

Figure 18:
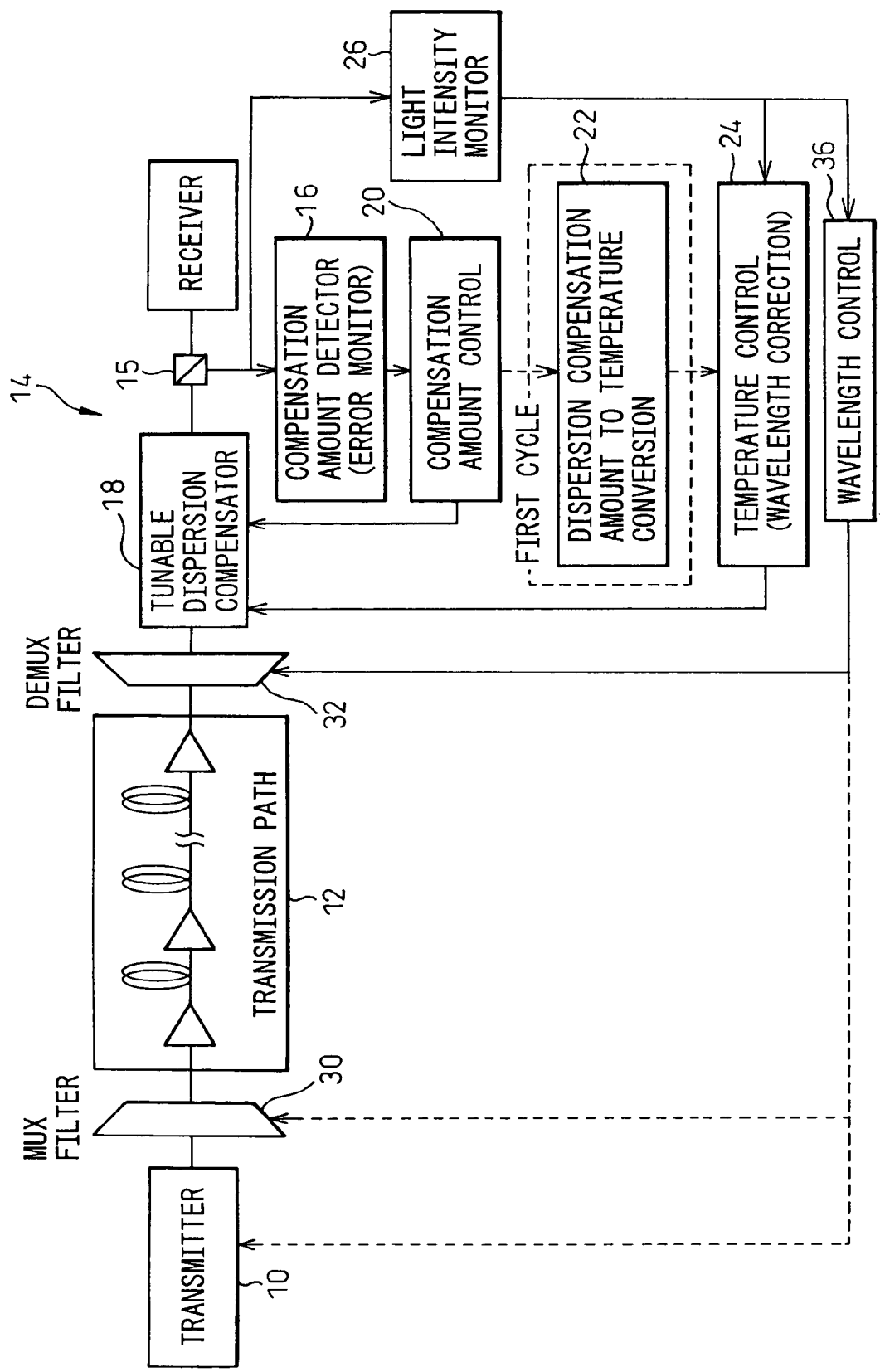
FIG. 18 is a block diagram of an optical transmission system according to a sixth embodiment of the present invention.
Figure 19:
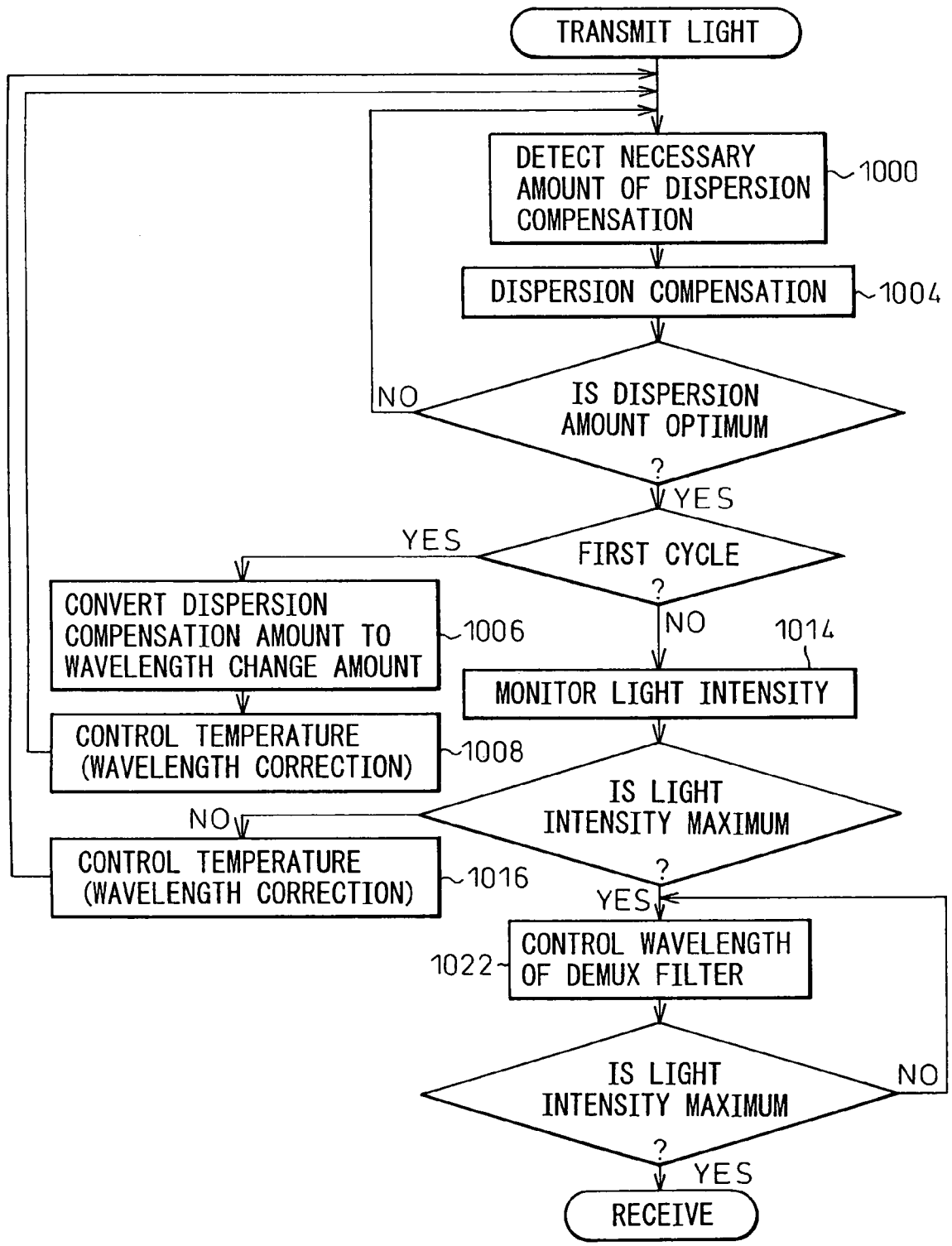
FIG. 19 is a flowchart illustrating the operation of a dispersion compensating section 14 in FIG. 18.

FIG. 18 shows the configuration of an optical transmission system according to a sixth embodiment of the present invention, and FIG. 19 shows its corresponding flowchart. In addition to the control performed in the third embodiment, while monitoring the received light intensity, any one of or all of the wavelengths of the light source 10, the center wavelength of the MUX filter 30, and the center wavelength of the DEMUX filter 32 are changed so that the received light intensity becomes best or optimum (36, step 1022). FIG. 19 shows an example in which the DEMUX filter 32 is controlled. In this way, the tunable devices such as the light source and the optical MUX/DEMUX filters can be optimized in an overall manner, and better transmission quality can thus be achieved.

Figure 20:
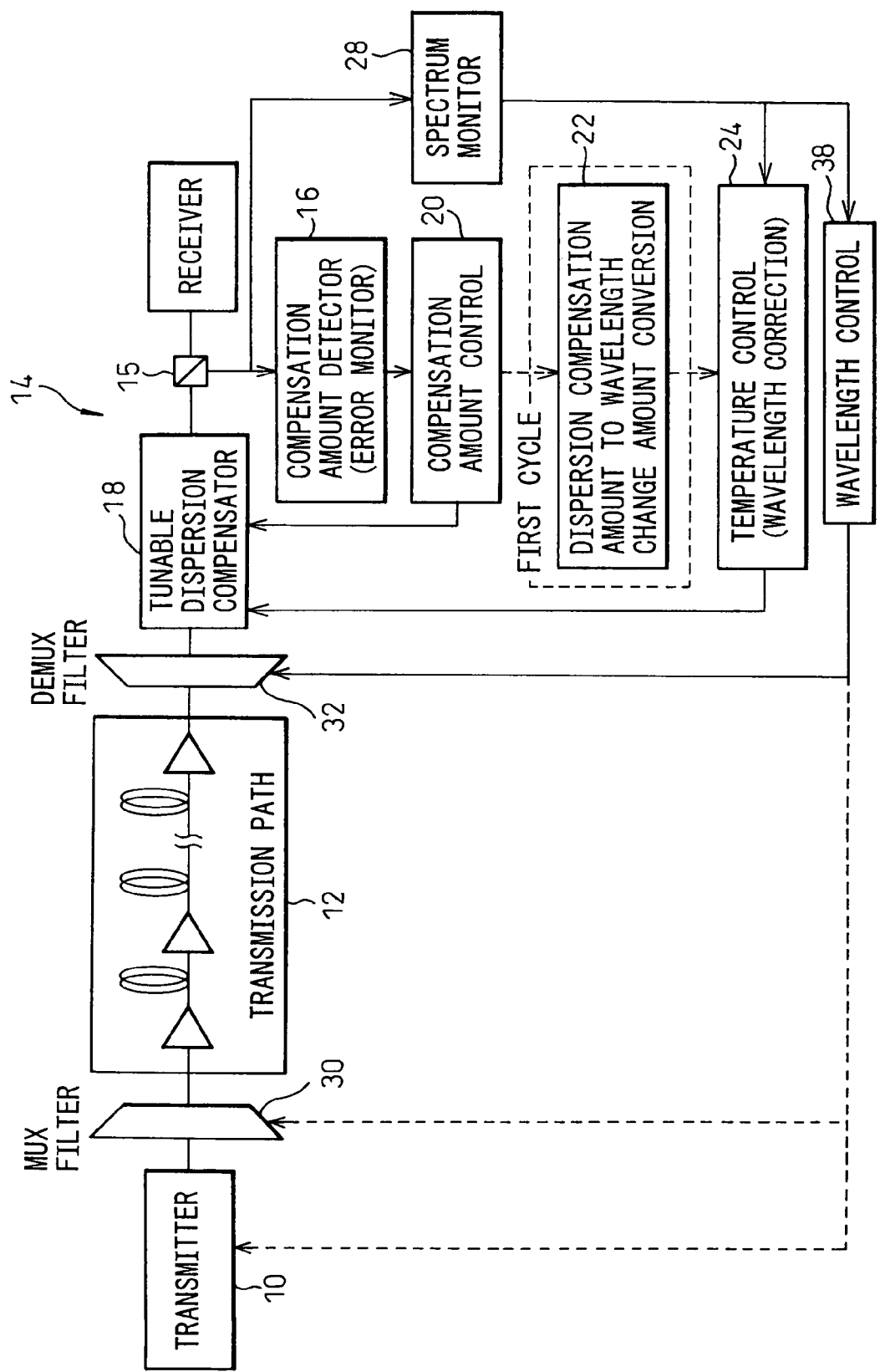
FIG. 20 is a block diagram of an optical transmission system according to a seventh embodiment of the present invention.
Figure 21:
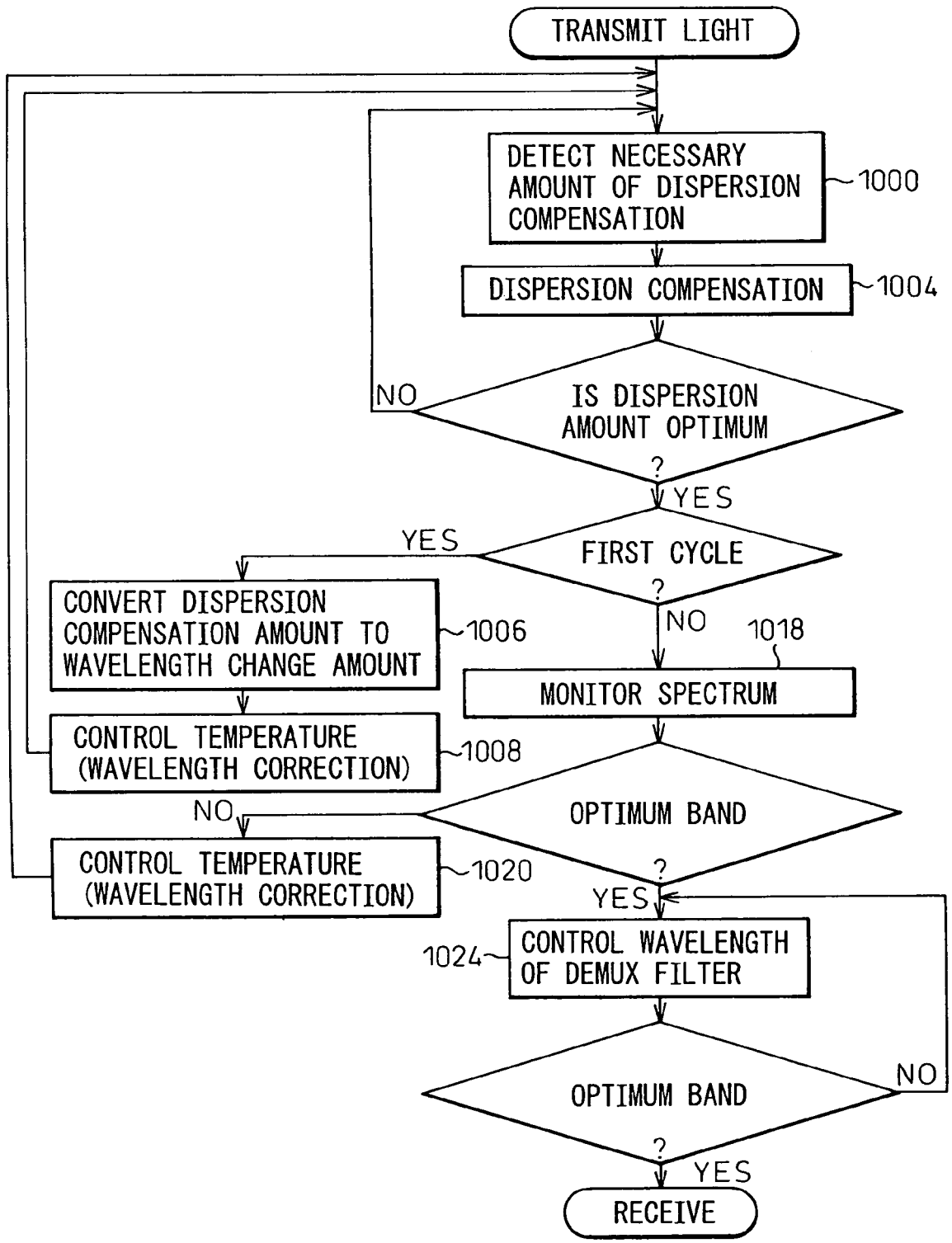
FIG. 21 is a flowchart illustrating the operation of a dispersion compensating section 14 in FIG. 20.

FIG. 20 shows the configuration of an optical transmission system according to a seventh embodiment of the present invention, and FIG. 21 shows the corresponding flowchart. In addition to the control performed in the fourth embodiment, while monitoring the received spectrum, any one of or all of the wavelengths of the light source 10, the center wavelength of the MUX filter 30, and the center wavelength of the DEMUX filter 32 are changed so that the spectrum becomes optimum (38, step 1024), as explained in the description of the fourth embodiment. FIG. 21 shows an example in which the DEMUX filter 32 is controlled. In this way, the tunable devices such as the light source and the optical MUX/DEMUX filters can be optimized in an overall manner, and better transmission quality can thus be achieved.

Figure 22:
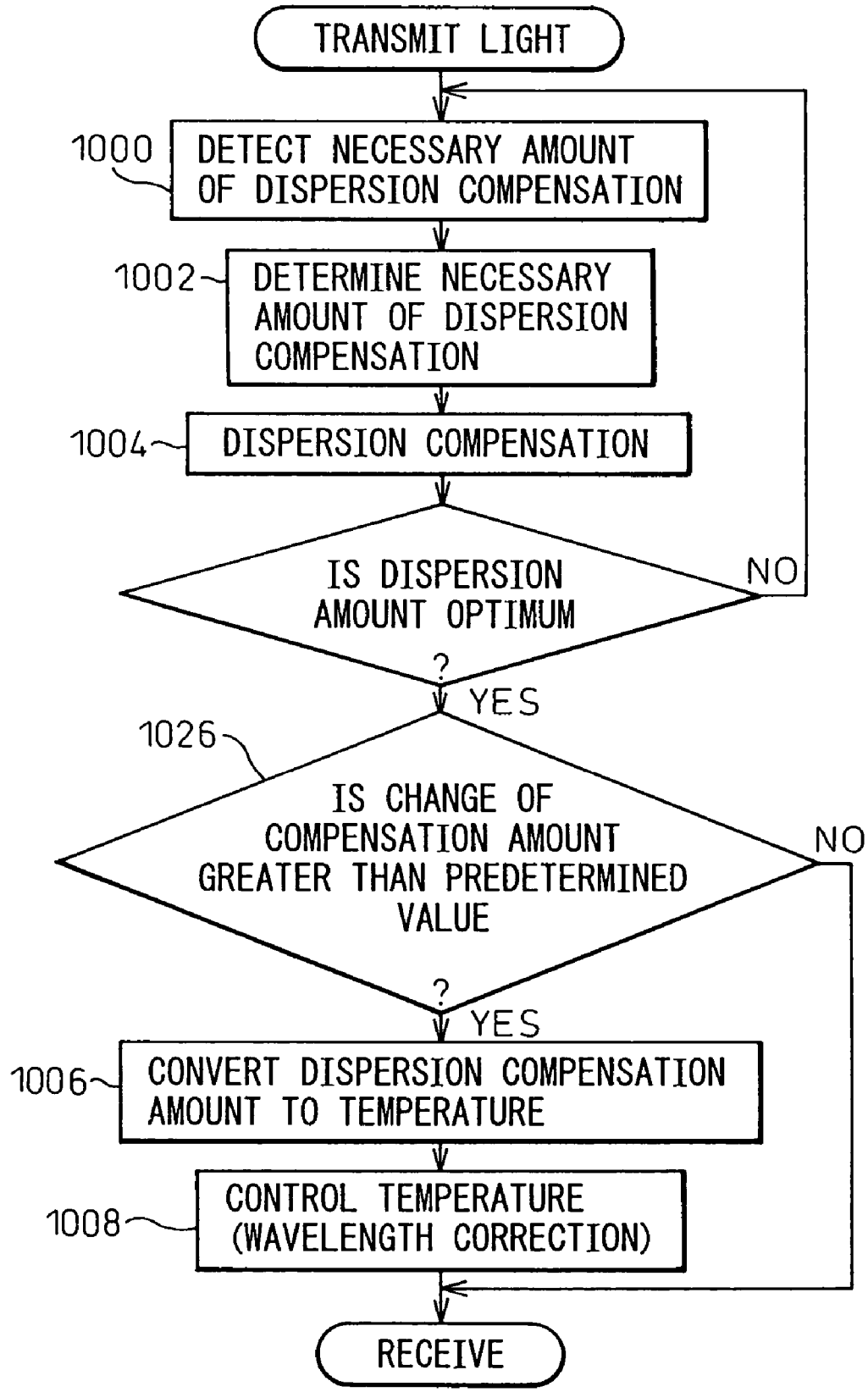
FIG. 22 is a flowchart illustrating one modified example of the first embodiment.

FIG. 22 shows a flowchart illustrating one modified example of the first embodiment described with reference to FIGS. 1 and 2. In the illustrated example, rather than performing the temperature control for any amount of change occurring in the amount of dispersion compensation as in the first embodiment, the control is performed only when a change greater than a predetermined value has occurred in the amount of dispersion compensation, and/or the control is performed each time a predetermined length of time has elapsed by monitoring the elapsed time. FIG. 22 shows an example in which the control is performed when a change greater than a predetermined amount has occurred (step 1026).

Similar modifications can be applied to the second to seventh embodiments. Any control so far described can be implemented by computer control.

The invention claimed is:

1. A filter device adjusting method for an optical transmission system that uses a filter device having first and second tunable parameters that can be controlled substantially independently of each other and having a passband characteristic that varies in a manner dependent on both of said first and second tunable parameters, said method comprising the steps of:
- (a) controlling said first tunable parameter so that received optical signal quality in said optical transmission system becomes best or optimum;
- (b) determining, from the amount of change of said first tunable parameter in said step (a), the amount of change of said second tunable parameter that can compensate for a resulting change occurring in said passband characteristic; and
- (c) changing said second tunable parameter of said filter device in accordance with said determined amount of change of said second tunable parameter.

2. A method according to claim 1, wherein said first tunable parameter is the amount of dispersion compensation of said filter device, and said second tunable parameter is the temperature of said filter device.

3. A method according to claim 2, further comprising the step of
- (d) carrying out, after said step (c), said step (a) and the step of controlling the temperature of said filter device repeatedly until received optical signal quality in said optical transmission system becomes best or optimum.

4. A method according to claim 3, further comprising the step of
- (e) changing the passband of another filter device and/or light source wavelength so that the received optical signal quality in said optical transmission system becomes best or optimum.

5. A method according to claim 4, wherein said steps (b) to (e) are carried out when the amount of change in said step (a) is greater than a predetermined value and/or at predetermined intervals of time.

6. A method according to claim 3, wherein said steps (b) to (d) are carried out when the amount of change in said step (a) is greater than a predetermined value and/or at predetermined intervals of time.

7. A method according to claim 2, further comprising the step of
- (d) carrying out, after said step (c), said step (a) and the step of controlling the temperature of said filter device repeatedly until received light intensity in said optical transmission system becomes best or optimum.

8. A method according to claim 7, further comprising the step of
- (e) changing the passband of another filter device or light source wavelength so that the received light intensity in said optical transmission system becomes best or optimum.

9. A method according to claim 2, further comprising the step of
- (d) carrying out, after said step (c), said step (a) and the step of controlling the temperature of said filter device repeatedly until received optical signal spectrum in said optical transmission system becomes optimum.

10. A method according to claim 9, further comprising the step of
- (e) changing the passband of another filter device or light source wavelength so that the received optical signal spectrum in said optical transmission system becomes optimum.

11. A method according to claim 2, wherein said steps (b) and (c) are carried out when the amount of change in said step (a) is greater than a predetermined value and/or at predetermined intervals of time.

12. A filter device adjusting apparatus for an optical transmission system that uses a filter device having first and second tunable parameters that can be controlled substantially independently of each other and a passband characteristic that varies in a manner dependent on both of said first and second tunable parameters, said apparatus comprising:
- means for controlling said first tunable parameter so that received optical signal quality in said optical transmission system becomes best or optimum;
- means for determining, from the amount of change of said first tunable parameter controlled by said first tunable parameter controlling means, the amount of change of said second tunable parameter that can compensate for a resulting change occurring in said passband characteristic; and
- means for changing said second tunable parameter of said filter device in accordance with said determined amount of change of said second tunable parameter.

13. An apparatus according to claim 12, wherein said first tunable parameter is the amount of dispersion compensation of said filter device, and said second tunable parameter is the temperature of said filter device.

14. An apparatus according to claim 13, further comprising means for performing, after the change by said temperature changing means, the control by said dispersion compensation amount controlling means and the temperature control of said filter device, repeatedly, until received optical signal quality in said optical transmission system becomes best or optimum.

15. An apparatus according to claim 14, further comprising means for changing the passband of another filter device and/or light source wavelength so that the received optical signal quality in said optical transmission system becomes best or optimum.

16. An apparatus according to claim 15, wherein said temperature change amount determining means, said temperature changing means, said repeatedly performing means, and said another filter device changing means are activated when the amount of change controlled by said dispersion compensation amount controlling means is greater than a predetermined value and/or at predetermined intervals of time.

17. An apparatus according to claim 14, wherein said temperature change amount determining means, said temperature changing means, and said repeatedly performing means are activated when the amount of change controlled by said dispersion compensation amount controlling means is greater than a predetermined value and/or at predetermined intervals of time.

18. An apparatus according to claim 13, further comprising means for carrying out, after the change by said temperature changing means, the control by said dispersion compensation amount controlling means and the temperature control of said filter device repeatedly until received light intensity in said optical transmission system becomes best or optimum.

19. An apparatus according to claim 18, further comprising means for changing the passband of another filter device or light source wavelength so that the received light intensity in said optical transmission system becomes best or optimum.

20. An apparatus according to claim 13, further comprising means for carrying out, after the change by said temperature changing means, the control by said dispersion compensation amount controlling means and the temperature control of said filter device, repeatedly, until received optical signal spectrum in said optical transmission system becomes optimum.

21. An apparatus according to claim 20, further comprising means for changing the passband of another filter device or light source wavelength so that the received optical signal spectrum in said optical transmission system becomes optimum.

22. An apparatus according to claim 13, wherein said temperature change amount determining means and said temperature changing means are activated when the amount of change controlled by said dispersion compensation amount controlling means is greater than a predetermined value and/or at predetermined intervals of time.

* * * * *